(12) United States Patent
Mailaender

(10) Patent No.: US 6,647,022 B1
(45) Date of Patent: Nov. 11, 2003

(54) INTERFERENCE CANCELLER

(75) Inventor: Laurence E. Mailaender, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/131,221

(22) Filed: Aug. 7, 1998

(51) Int. Cl.[7] .......................... H04B 1/707; H04J 13/04
(52) U.S. Cl. ...................... 370/441; 370/535; 375/148; 375/347; 375/349
(58) Field of Search ................. 370/282, 286, 370/294, 335, 342, 479, 498, 535, 441; 375/144, 148, 285, 346, 347, 348, 349

(56) References Cited

U.S. PATENT DOCUMENTS

| | | | | |
|---|---|---|---|---|
| 4,527,020 A | * | 7/1985 | Ito .......................... 179/170.2 |
| 5,341,395 A | * | 8/1994 | Bi .................................. 375/1 |
| 5,463,660 A | * | 10/1995 | Fukasawa et al. .......... 375/205 |
| 5,493,307 A | * | 2/1996 | Tsujimoto .................. 342/380 |
| 5,553,062 A | * | 9/1996 | Schilling et al. .............. 370/18 |
| 5,579,304 A | * | 11/1996 | Sugimoto et al. ............. 370/18 |
| 5,644,592 A | * | 7/1997 | Divsalar et al. ............ 375/206 |
| 5,687,162 A | * | 11/1997 | Yoshida et al. ............. 370/203 |
| 5,790,588 A | * | 8/1998 | Fukawa et al. ............. 375/200 |
| 5,982,825 A | * | 11/1999 | Tsujimoto ................... 375/347 |
| 6,067,333 A | * | 5/2000 | Kim et al. .................. 375/346 |
| 6,157,685 A | * | 12/2000 | Tanaka et al. .............. 375/346 |

OTHER PUBLICATIONS

R. Kohno et al., "Combination of an Adaptive Array Antenna and a Canceller of Interference for Direct–Sequence Spread–Spectrum Multiple–Access System," IEEE Journal on Selected Areas in Communications, vol. 8, No. 4, May 1990, pp. 675–681.

* cited by examiner

*Primary Examiner*—Alpus H. Hsu

(57) ABSTRACT

An apparatus and method for performing interference cancellation by dividing a signal for K users, where K>1, into N time segments, where N>1; successively canceling interference for each of the N segments to produce K user symbols, where the cancellation is performed for each of the N segments independent of any other segment; and combining the K user symbols into a stream of successive data bits.

35 Claims, 2 Drawing Sheets

INTERFERENCE CANCELLER

BACKGROUND OF THE INVENTION

1. Field of the Invention

The present invention relates to interference canceling, and more particularly, to interference canceling for use in a code division multiple access (CDMA) cellular telephone system.

2. Description of the Related Art

Code Division Multiple Access (CDMA) is a digital multiple access method specified by the Telecommunications Industry Association (TIA) as IS-95. CDMA is a form of spread-spectrum. The basic principle of spread-spectrum is the use of noise-like carrier waves, and, as the name implies, bandwidths much larger than that required for simple point-to-point communication at the same data rate. CDMA receivers separate communications channels using pseudo-random modulation that is applied and removed in a digital domain, not on the basis of frequency. Multiple users occupy the same frequency band. This universal frequency reuse is crucial to the very high spectral efficiency that is characteristic of CDMA.

CDMA systems are interference limited, which means that the interference caused by other users is the critical factor which prevents even more users from being added. Therefore, controlling the impact of interference is a key concern in systems which use CDMA.

Current systems, such as IS-95, derive their interference reduction from two sources, random spreading codes and power control. Random spreading ensures the interference looks like noise, not a signal and power control attempts to keep the interference power at a minimum.

A completely different approach to improving systems which use CDMA is to actively cancel interference, rather than having it contribute to noise. Such approaches improve CDMA system capacity by at least 50%. Two types of known interference cancellers are "parallel" and "successive" interference cancellers, where successive interference cancellers are generally considered to provide better performance.

In both, interference signals are subtracted out from the desired signal. The difference is primarily the order in which the subtraction is performed. In a parallel canceller, all subtractions are done at the same instant. For example, a parallel canceller includes a number of parallel processors. Each parallel processor includes a detector, a regenerator, a subtractor, and a delay circuit. Each parallel processor receives the same input signal. If there are K users in the system, then each branch of the parallel canceller receives K input signals. Each parallel branch of the parallel canceller "picks out" one user signal from the total and subtracts that one user signal.

Successive cancellers differ from parallel cancellers in that cancellations are not done at the same instant, but rather sequentially. In particular, the first serial processor in the successive canceller receives K signals, the second serial processor receives only K–1, then K–2, and so on. By the time the signal gets to the second serial processor, one signal has been cancelled. If the cancellations are done correctly, then each successive serial processor down the chain receives a signal with a better signal-to-noise ratio.

As shown in FIG. 1, the structure of a conventional successive interference canceller 10 includes several identical processors 12, 14, 16, in series. Each serial processor 12, 14, 16 includes a detector 20 which produces a data bit estimate 34, a regenerator 24 which receives the data bit estimate 34, and produces a waveform 26, a delay circuit 28 which delays the input signal to processor 12 to produce a delayed signal 30, and a subtractor 32 which subtracts the waveform 26 output from the regenerator 24 from the delayed signal 30 output from the delay circuit 28 to produce a signal including K–1 users 35.

Each serial processor 12, 14, 16 in the "pipeline" architecture illustrated in FIG. 1 can be implemented as a separate microprocessor or as a separate digital signal processor circuit. The "pipeline" architecture is used to divide up the problem because of the limited speed of each microprocessor/digital signal processor circuit by assigning each of the K users to a separate serial processor 12, 14, 16, which can be implemented separately from the other serial processors, and hence run quickly. Each serial processor 12, 14, 16 produces a data bit estimate 34, 36, 38 for one of the K users.

There are several problems with the conventional successive interference canceller illustrated in FIG. 1. One is the delay for a particular user. The data for the Kth user is not detected until K symbol times after receipt, which is often unacceptably long. The second problem is a "reordering" problem. To achieve the best performance from a successive canceller, the K users must be assigned to particular places in the hierarchical chain, depending on the power of the user's signal. This order must change from time to time as the K users move about and their signal strengths vary. An order controller 40 is required to control the detector 20 and the regenerator 24 by assigning spreading codes, parameters, etc., to each serial processor 12, 14, 16, and this ordering must change in real time since the ordering reflects the receive power of each user.

This reordering causes a special problem for the conventional successive interference canceller architecture. To illustrate this problem, assume a receiver is running with an established order of users. Due to signal strength variations, a third user (user 3), should be placed first (the current location of user 1), and user 1 should be moved to the previous location of user 3. If the order is switched immediately, the data "in the pipeline" that is being held in between positions will be adversely affected. In this example, the data at stage 2 has already canceled user 1. However, when reaching stage 3, the architecture now cancels user 1 again, and user 3 is never canceled.

SUMMARY OF THE INVENTION

The present invention solves this problem by providing a successive interference canceller which includes a number of parallel processors. Rather than being assigned a particular user, each of the parallel processors is assigned a time segment which includes data for all users. Each processor receives an assigned time segment and assigns an order to each of the K user signals independent of the other processors. The outputs of the N processors are then multiplexed together to form a data signal for all K users in time sequence. This architecture does not result in an unacceptable delay for any one of the users and does not have the same reordering problem found in the conventional successive interference canceller architecture, since each processor is permitted to assign its own order independently.

DETAILED DESCRIPTION OF THE INVENTION

Figure 1:
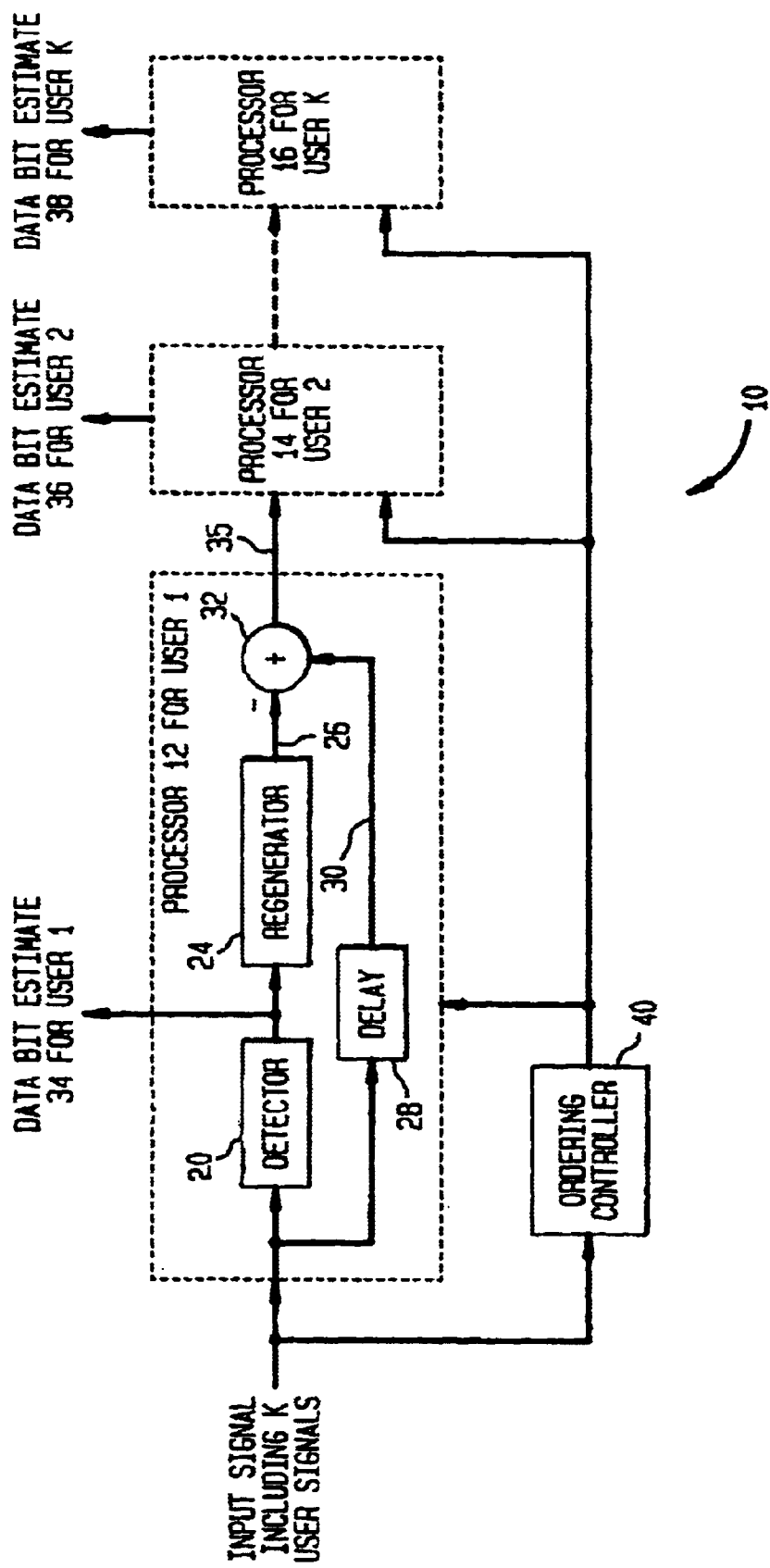
FIG. 1 is a block diagram of a conventional successive interference canceller.
Figure 2:
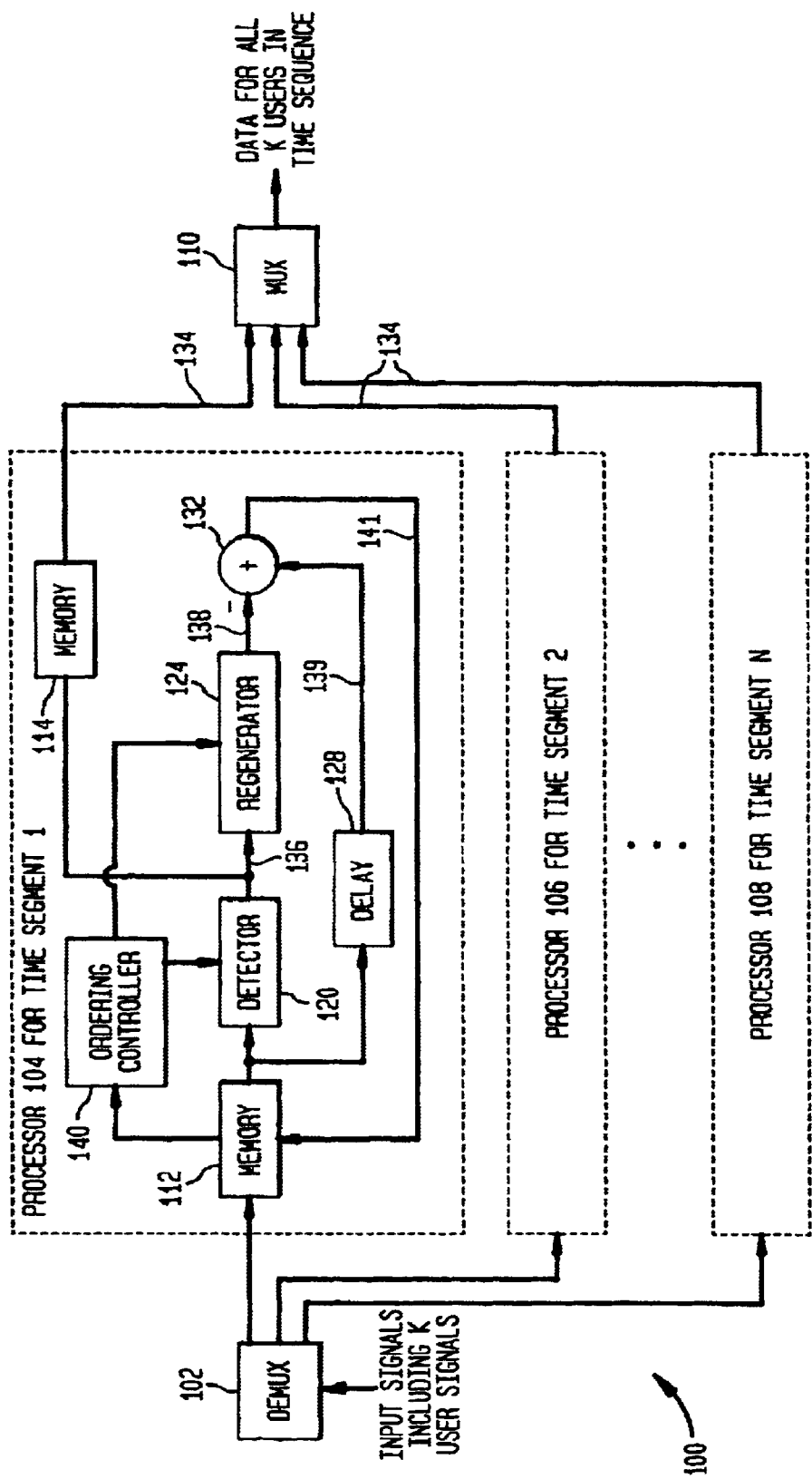
FIG. 2 illustrates a successive interference canceller with parallel processors, in one embodiment of the present invention.

FIG. 2 illustrates the successive interference canceller of the present invention in one embodiment. In particular, the successive interference canceller 100 includes a demultiplexer 102, N processors 104, 106, 108 (where N>1) and a multiplexer 110. Each of the N processors 104, 106, 108 includes a memory 112, a detector 120, a memory 114, a regenerator 124, a delay 128, a subtractor 132, and an ordering controller 140. All the functions of the N processors 104, 106, 108 including the functions of the detector 120, the regenerator 124, the delay 128, the subtractor 132 and the ordering controller 140 can also be implemented through the use of software, embodied on an appropriate medium, executing on a processor. In a preferred embodiment, each of the N processors is a digital signal processor chip.

The successive interference canceller 100 illustrated in FIG. 2 operates as discussed below. The demultiplexor 102 receives an input signal including K user signals and demultiplexes the input signal into N (wherein N>1) time segments, where each time segments contains a portion of each of the K user signals. Each of the N time segments is supplied to a corresponding one of the N processors 104, 106, 108. Each of the N processors 104, 106, 108 assigns its own unique ordering to each of the K user signals supplied thereto, independent of the ordering applied by the other N−1 processors. Each of the N processors 104, 106, 108 outputs K user symbols for their assigned time segment. The K user symbols output from the N processors are input to multiplexor 110, which multiplexes the K user symbols to form a data signal for all K users in time sequence.

As illustrated in FIG. 2, each of the N processors 104, 106, 108 receives a time segment which contains a portion of each of the K user signals. The time segment is input to a memory 112 and then provided to the detector 120 and the delay 128. The detector 120 produces a resulting symbol 136 for a first of the K users, which is supplied to the regenerator 124 which produces a waveform 138. The waveform 138 output from the regenerator 124 is subtracted from a delayed signal 139 from the memory 112 (delayed by delay 128) in subtractor 132. The output 141 of subtractor 132 is returned to the memory 112. The above functions are then repeated for each of the K users. The resulting symbols 136 output from the detector 120 are stored in memory 114 until all K users are completed. Once all K users are completed, the memory 114 outputs the K users symbols 134 for the time segment applied to the processor 104, to multiplexer 110.

In one embodiment, each of the N processors 104, 106, 108 is a conventional serial canceller. As set for above, each of the N processors are assigned a time segment and not a single one of the K users.

In another embodiment, the N time segments overlap in order to ensure no data is lost. As illustrated in FIG. 2, since each of the N processors 104, 106, 108 is working in parallel, the K user symbols 134 are output at substantially the same time and none of the K user symbols are subject to the delay caused by storage in a data pipeline, as described in the conventional successive interference canceller.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed:

1. An interference canceller, comprising:
   a demultiplexer, for receiving a signal including K user signals (K>1) and demultiplexing the signal into N(N>1) time segments, each containing a portion of the K user signals;
   N processors, each receiving one of the N time segments and each assigning an order to each of the K user signals, independent of the other N−1 processors, each of the N processors outputting K user symbols; and
   a multiplexer, multiplexing the K user symbols from each of said N processors together to form a data signal for all K users in time sequence.

2. The interference canceller of claim 1, wherein each of said N processors is a serial canceller.

3. The interference canceller of claim 2, wherein each serial canceller detects a resulting symbol, applies the resulting symbol to a regenerator to produce a waveform, and subtracts the waveform from a stored input waveform for each of the K users in an order independently determined by each of said N processors.

4. The interference canceller of claim 1, wherein each of said N processors are assigned a time segment, and not a single one of the K users.

5. The interference canceller of claim 1, wherein time periods for the N time segments overlap.

6. The interference canceller of claim 1, wherein said N processors output the K user symbols at substantially the same time.

7. The interference canceller of claim 1, wherein none of the K user symbols are subject to a delay caused by storage in a data pipeline.

8. The interference canceller of claim 1, wherein all of said N processors are connected in parallel.

9. The interference canceller of claim 1, wherein each of said N processors is a digital processor chip.

10. A method of performing interference cancellation on a received signal including K user signals (K>1), comprising the steps of:
    demultiplexing the signal into N(N>1) time segments, each containing a portion of the K user symbols;
    assigning an order to each of the K user signals, said assigning being performed independently for each of the N time segments;
    developing K user symbols for each of the N time segments; and
    multiplexing the K user symbols for each of the N time segments together to form a data signal for all K users in time sequence.

11. The method of claim 10, further comprising the steps of:
    match filtering K user signals;
    detecting a resulting symbol;
    applying the resulting symbol to a spread spectrum modulator to produce a waveform; and
    subtracting the waveform from a stored input waveform for each of the K user signals in an order independently determined.

12. The method of claim 10, wherein time periods for the N time segments overlap.

13. The method of claim 10, wherein the K user symbols are output at substantially the same time.

14. The method of claim 10, wherein none of the K user symbols are subject to a delay caused by storage in a data pipeline.

15. A method of performing interference cancellation, comprising the steps of:
- dividing a signal for K users (K>1) into N(N>1) time segments;
- successively canceling interference for each of the N segments to produce K user symbols, said canceling being performed for each of the N segments independent of any other segment; and
- combining the K user symbols into a stream of successive data bits.

16. The method of claim 15, wherein time periods for the N time segments overlap.

17. The method of claim 15, wherein the K user symbols are output at substantially the same time.

18. The method of claim 15, wherein none of the K user symbols are subject to a delay caused by storage in a data pipeline.

19. An interference canceller, comprising:
- dividing means for dividing a signal including K user signals (K>1) into N(N>1) time segments, each containing a portion of the K user signals;
- N processing means, each receiving one of the N time segments and each assigning an order to each of the K user signals, independent of the other N−1 processors, each of the N processing means outputting K user symbols; and
- multiplexing means for multiplexing the K user symbols from each of said N processing means together to form a data signal for all K users in time sequence.

20. The interference canceller of claim 19, wherein each of said N processing means is a serial canceller.

21. The interference canceller of claim 20, wherein each serial canceller detects a resulting symbol, applies the resulting symbol to a regenerator to produce a waveform, and subtracts the waveform from a stored input waveform for each of the K users in an order independently determined by each of said N processing means.

22. The interference canceller of claim 19, wherein each of said N processing means are assigned a time segment, and not a single one of the K users.

23. The interference canceller of claim 19, wherein time periods for the N time segments overlap.

24. The interference canceller of claim 19, wherein said N processing means output the K user symbols at substantially the same time.

25. The interference canceller of claim 19, wherein none of the K user symbols are subject to a delay caused by storage in a data pipeline.

26. The interference canceller of claim 19, wherein all of said N processing means are connected in parallel.

27. The interference canceller of claim 19, wherein each of said N processing means is a digital signal processor chip.

28. A processor programmed to perform interference cancellation, said processor being operable to:
- divide a signal for K users (K>1) into N(N>1) time segments;
- successively cancel interference for each of the N segments to produce K user symbols, said canceling being performed for cash of the N segments independent of any other segment; and
- combine the K user symbols into a stream of successive data bits.

29. An interference canceller comprising:
- a first processor operable to divide a signal for K users (K>1) into N(N>1) time segments;
- a second processor operable to successively cancel interference for each of the N segments to produce K user symbols, said canceling being performed for each of the N segments independent of any other segment; and
- a third processor operable to combine the K user symbols into a stream of successive data bits.

30. The interference canceller of claim 29, wherein said second processor includes a plurality of digital symbol processor chips.

31. A computer program embodied on a computer-readable medium for performing interference cancellation on a communication signal for K users (K>1), said computer program comprising:
- a division source code segment for causing a computer to divide a signal for K user (K>1) into N(N>1) time segments;
- an interference canceling source code segment for causing the computer to successively cancel interference for each of the N segments to produce K user symbols, said canceling being performed for each of the N segments independent of any other segment:
- a combining source code segment for causing the computer to combine the K user symbols into a stream of successive data bits.

32. A method of performing interference cancellation, comprising the steps of:
- dividing a signal for K users (K>1) into N(N>1) time segments;
- successively canceling interference for each of the N segments to produce K user symbols, said canceling being performed for each of the N segments independent of any other segment; and
- combining K user symbols into a single signal.

33. The method of claim 32, wherein time periods for the N time segments overlap.

34. The method of claim 32, wherein said K user symbols are output at substantially the same time.

35. The method of claim 32, wherein none of said K user symbols are subject to a delay caused by storage in a data pipeline.

* * * * *